United States Patent [19]

Cox

[11] Patent Number: 4,654,263
[45] Date of Patent: Mar. 31, 1987

[54] POLYMER COMPOSITION

[75] Inventor: Michael K. Cox, Durham, England

[73] Assignee: Imperial Chemical Industries, Plc, London, England

[21] Appl. No.: 693,351

[22] Filed: Jan. 22, 1985

[30] Foreign Application Priority Data

Feb. 9, 1984 [GB] United Kingdom ............... 8403419
Jan. 11, 1985 [GB] United Kingdom ............... 8500663

[51] Int. Cl.$^4$ ................................................ B32B 9/00
[52] U.S. Cl. ................................ 428/366; 428/378; 428/460; 524/404
[58] Field of Search ............... 524/404, 592; 428/366, 428/460, 378

[56] References Cited

U.S. PATENT DOCUMENTS

| | | | |
|---|---|---|---|
| 3,756,982 | 9/1973 | Korshak et al. | 524/404 |
| 4,316,834 | 2/1982 | Ueda et al. | 524/404 |
| 4,320,224 | 3/1982 | Rose et al. | |
| 4,360,630 | 11/1982 | Smith | 524/592 |

FOREIGN PATENT DOCUMENTS

| | | | |
|---|---|---|---|
| 54-99137 | 8/1979 | Japan | 524/404 |
| 56-106975 | 8/1981 | Japan | 524/404 |
| 56-145605 | 11/1981 | Japan | 524/404 |
| 58-138747 | 8/1983 | Japan | 524/404 |
| 58-160348 | 9/1983 | Japan | |
| 1246770 | 9/1971 | United Kingdom | |

OTHER PUBLICATIONS

Patent Abstracts of Japan, vol. 4, No. 159, Nov. 6, 1980, p. 5 C 30.
Japanese Patent Publications (Kokai) 58-138747 and 58-160345, (a copy of the Derwent Abstract (83-773229/39) of the former is enclosed).
Japanese Abstract Kokai 58(1983) 138747.
Japanese Kokai 58 (1983) 160346.

*Primary Examiner*—Lewis T. Jacobs
*Attorney, Agent, or Firm*—Cushman, Darby & Cushman

[57] ABSTRACT

A polyaryletherketone composition has a plurality which is such that a wire coated with the composition has a recoil of not more than 40°. Compositions having such pliability include those containing a polyaryletherketone and boron nitride. The polyaryletherketone can be polyaryletheretherketone. The composition can be obtained by blending together the polymer and boron nitride, and the blend can be extruded onto an electrical conductor. When extruded onto a wire, the composition gives a more pliable coated wire than is obtained using the polymer alone as the wire coating. The composition gives a coherent coating when coated onto a wire. The composition is also suitable for the production of bearings or bearing liners.

13 Claims, No Drawings

POLYMER COMPOSITION

The present invention relates to polymer compositions, and the production and use of such compositions.

Polymeric materials are now extensively used for many purposes and in recent years polymers have become available which have high melting or softening points which make them suitable for use at higher temperatures than are attainable using the longer established polymeric materials. Polyaryether derivatives such as polyaryletherketones are examples of such polymers which, in addition to having high service temperatures have other desirable properties such as electrical insulation characteristics. Polyaryletherketones have good electrical insulating properties and high melting or softening temperatures. Some polymers of this type can be used as en electrical insulator continuously at temperatures in excess of 200° C., for example up to about 250° C. However it will be appreciated that the period of use at elevated temperature is dependent on the temperature and decreases as the temperature is increased. Although the polyaryletherketones have got properties which make them suitable for use as high temperature electrical insulators, many of these polymers have a high flexural modulus and hence may not be entirely suitable for use as a wire coating if the coated wire requires pliability. It has been found that certain additives, for example fluorinated ethylene-propylene copolymers and ethylene-tetrafluoroethylene copolymers, can improve the pliability of the polymer. However, when compositions containing these additives are used for wire coating, the coating shows reduced coherency and had a tendency to crack or even fall apart.

According to the present invention there is provided a polyaryletherketone composition which has a pliability which is such that a copper wire of mean diameter 1 mm, when coated with the composition to give a coating of 0.25 mm average thickness, shows a recoil, after bending through 90°, of not more than 40°.

Pliability is determined by bending annealed, coated wires over a 6 mm diameter mandrel. The load applied is increased until it is sufficient to bend the coated wire through 90°. The amount of recoil is measured after removing, from the coated wire, the minimum load required to bend the coated wire through 90°. For convenience hereafter, the foregoing procedure will be referred to as the "recoil test".

We have found that the amount of recoil is influenced by the load applied in order to bend the coated wire. Accordingly, the amount of recoil is measured using the minimum load to bend the coated wire through 90°. The recoil test is effected at ambient temperature conditions, which are typically from 15° C. up to 30° C. Depending on the composition, the load required to bend the coated wire through 90° may be one kilogramme or greater. However, with some compositions in accordance with the present invention the minimum load is less than one kilogramme and may be 0.5 kilogramme or even less. Preferred compositions provide coherent coatings on the wire and are suitable for use at temperatures in excess of 200° C. for continuous periods of many weeks.

We have found that compositions having these properties are produced by the addition of boron nitride to the polyaryletherketone.

Thus, according to a further aspect of the present invention there is provided a polymer composition which comprises a mixture of a polyaryletherketone with boron nitride.

The composition may include other components which are suitable for incorporation into a polyaryletherketone. Such other components include, for example, inorganic and organic fibrous fillers such as glass fibre, carbon fibre and poly-paraphenylene terephthalamide fibre; organic and inorganic fillers such as polytetrafluoroethylene, graphite, mica, talc and vermiculite; and stabilisers such as phosphates.

It is preferred that the total proportion of additives (including boron nitride) is at least 1%, and does not exceed 70%, by weight of the composition and especially does not exceed 50% by weight of the composition. The composition preferably contains from 5 up to 30% by weight of boron nitride relative to the total weight of the composition. Compositions in accordance with the present invention include compositions consisting essentially of 70 to 95% by weight of the polyaryletherketone and correspondingly 30 to 5% by weight of boron nitride.

The polyaryletherketone component of the polymer composition may be a polymer which contains the repeat units

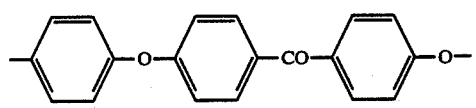

or the repeat units

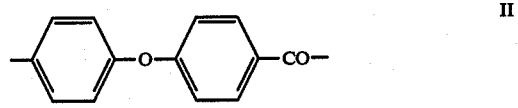

alone or in conjunction with each other and/or in conjunction with other repeat units.

The other repeat units which may be present in the polyaryletherketone are typically of the general formula

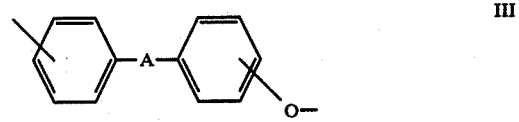

where A is a direct link, a sulphur atom, a divalent hydrocarbon radical or a group

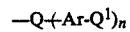

in which
Q is —CO—, —SO$_2$— or —O—;

$Q^1$ is —CO—, —SO$_2$— or —O—;

Ar is a divalent aromatic radical; and n is 0, 1, 2 or 3.

In the formula III, if the group A is a divalent hydrocarbon radical it is typically a phenylene group or a dimethylmethylene group (—C(CH$_3$)$_2$). The aromatic radical Ar is preferably a divalent aromatic radical selected from phenylene, biphenylylene or terphenylylene.

We prefer that the polyaryletherketone is a crystalline polymer containing the repeat units I. Especially preferred are such polymers which are tough and have an inherent viscosity of at least 0.7, as is described in more detail in our European Patent Publication No. 001 879. Inherent viscosity is measured at 25° C. on a solution of the polymer in concentrated sulphuric acid of density 1.84 g cm$^{-3}$, said solution containing 0.1 g of polymer per 100 cm$^3$ of solution. As an alternative to inherent viscosity, an indication of the average molecular weight of the polymer may be obtained by measuring the melt viscosity of the polymer. Preferred polymers have a melt viscosity of at least 0.1 KNs/m$^2$, which corresponds to an inherent viscosity of 0.7. The melt viscosity is measured using a ram extruder fitted with a 3.175 mm×0.5 mm die and operating at 400° C. and a shear rate of 1000 s$^{-1}$.

The boron nitride is preferably of at least 99% purity. Preferably the boron nitride is in the form of a powder of small particle size, for example having a weight average particle size of not more than 10 micrometers, particularly not more than 5 micrometers.

The polymer composition may be made by admixture of the two components plus any additional optional components in a suitable mixing machine to effect particle or melt blending. More specifically, the polyaryletherketone and boron nitride, in the form of dry powders or granules or mixtures thereof, can be mixed together using a suitable solids blending technique such as tumble blending or a high speed mixer. The blend thus obtained may be extruded into a lace which is chopped to give granules. The granules can be used to produce shaped articles by the use of a suitable forming operation, for example injection moulding or extrusion, to give a shaped article.

The shaped article obtained from the polymer composition is preferably an electrical conductor on which the polymer composition is the insulating layer or is a sheath for one or more insulated conductors. If desired, the polymer composition can be used both as the insulating layer and the outer sheath.

The formation of the insulating layer or outer sheath can be effected using standard wire coating conditions with the exception that the extruder is operated at a higher temperature than is usual with most plastics materials, for example at a barrel temperature of at least 340° C. and preferably with a die temperature which is at least 375° C., and which may be in excess of 400° C.

Wires insulated with a polymer composition of polyaryletherketone and boron nitride are more pliable than wires insulated with the polyaryletherketone only.

Some of the compositions of the present invention have been found to have a lower coefficient of friction and a higher limiting PV value (as defined in Notes to Table Seven) than either the polymer alone or a blend of the polymer and the same proportion by weight of poly-tetrafluoroethylene. Such a combination of properties makes the composition suitable for use in bearing applications. Thus, the polymer compositions may also be used as a bearing or as a bearing liner.

Thus, as a further aspect of the present invention there is provided a plain bearing formed of a polymer composition as herein described or comprising a metal backing having a lining formed of a polymer composition as herein described.

If the composition is used to form a plain bearing this may be done by injection moulding the composition onto the bearing. Alternatively, the composition may be extruded into the form of a rod, the centre of which is machined out to form the bearing.

The composition may also be used as a bearing liner on a metal backing. The metal backing may be any suitable metal such as, for example, aluminium alloy or steel with a suitable surface layer to assist in bonding the lining to the backing. The lining may be a thick coating of 0.75 to 35 mm in thickness but may be an overlay, for example of 10 to 30 micrometers, applied to a metal bearing lining. The polymer composition is preferably applied to the metal backing as a sheet. The polymer composition may be extruded to form a sheet and the sheet issuing from the extruder then bonded to the metal backing as a second stage of a single operation. Alternatively, a preformed sheet of the polymer composition is pressure bonded or roll-bonded to a heated metal backing. The temperature of bonding the polymer composition to the metal backing is preferably sufficiently high that the composition can flow under the conditions of bonding to the backing and typically the temperature is at least 350° C. The coated backing is preferably allowed to cool slowly from the temperature of bonding to ambient temperature to permit the polyaryletherketone component of the polymeric composition to attain a high crystallinity, for example at least 30%.

The polymer composition also has improved burning characteristics compared to the respective polymer alone. More specifically, the polymer composition has a higher oxygen index compared to the respective polymer alone.

The present invention is illustrated by the following examples and test results.

EXAMPLE 1

Boron nitride (obtained from Borax Consolidated Borides Division, Lake Road, Newport Industrial Estate, Gwent, NPT OSR, Great Britain) and polyetheretherketone ('Victrex' (Registered Trade Mark) PEEK aromatic polymer 450 P grade, obtainable from Imperial Chemical Industries PLC) were dry mixed by tumble blending for 15 minutes in the proportions of 15% by weight of boron nitride and 85% by weight of polyetheretherketone.

The blend was then formed into granules by extrusion into a lace which was cooled by passing into a water bath and the lace was then cut to form granules. The extrusion was effected using a single screw Plaston extruder having a 3.8 cm diameter screw with a length to diameter ratio of 24:1 and having the following temperature profile from the hopper end to the die 345° C., 360° C., 365° C., 370° C. and 380° C. The die was of 5 mm diameter and the extruder was operated at a rate of about 5 kg/hour.

EXAMPLES 2 AND 3

The procedure of Example 1 was repeated using different proportions of boron nitride to give compositions containing 5% by weight of boron nitride (Example 2) and 10% by weight of boron nitride (Example 3).

The composition of Example 1 was coated onto a 1 mm diameter copper wire using an 18 mm Bone extruder fitted with a Betol designed tubing wire coating die with total diameter of 1.5 mm. The wire was passed through the die at a rate of about 15 m/minute and the extruder was operated at a rate of about 1.6 kg/hour to give a coating of average thickness 0.25 mm. The die temperature for wire coating was about 400° C.

For the purposes of comparison, samples of the copper wire were also coated with the polymer (polyetheretherketone) alone.

The coated wires were then subjected to tests of continuous use temperature, solvent resistance and pliability and the results of these tests are set out in Tables One to Three respectively.

TABLE ONE

| | Coating | | | |
|---|---|---|---|---|
| | PEEK (a) | | PEEK + BN (b) | |
| Ageing Time (Weeks) | 240° C. (c) | 300° C. (c) | 240° C. (c) | 300° C. (c) |
| 1 | Pass | Pass | Pass | Pass |
| 2 | Pass | Pass | Pass | Pass |
| 3 | Pass | Pass | Pass | Pass |
| 4 | Pass | Fail | Pass | Fail |
| 5 | Pass | — | Pass | — |
| 6 | Pass | — | Pass | — |
| 7 | Pass | — | Pass | — |
| 8 | Pass | — | Pass | — |
| 9 | Pass | — | Pass | — |

Notes to Table One
(a) PEEK indicates that the polymeric material used for coating onto the wire was polyetheretherketone ('Victrex' (Registered Trade Mark), PEEK aromatic polymer, 380 G grade, obtainable from Imperial Chemical Industries PLC).
(b) PEEK + BN indicates that the polymeric material used for coating onto the wire was the 85% by weight polyetheretherketone - 15% by weight boron nitride blend obtained as described in Example 1.
(c) The wire samples were then tested for ID wrap failure, by wrapping the coated wire around itself and ageing for the time, and at the temperature indicated. The wire samples were examined visually periodically. Any cracking observed was classed as a failure and the test was not continued further.

TABLE TWO

| | Coating | |
|---|---|---|
| Test (d) | PEEK (a) | PEEK + BN (b) |
| 1 D wrap | One crack detected | No cracks |
| 3 D wrap | Scattered cracks | Scattered surface cracks |
| 5 D wrap | Cracked | Cracked |
| 14 D wrap | Numerous deep cracks | Cracked, but cracks not as large or deep as PEEK |

Notes to Table Two
(a) and (b) are as defined in Notes to Table One.
(d) The coated wires were annealed at 150° C. for 24 hours in a circulating air oven. The annealed, coated wires were wrapped round mandrels (glass tubes) of diameter - 1, 3, 5 and 14 times that of the coated wire to give 1 D, 3 D, 5 D and 14 D wrap respectively. The wires wrapped round the mandrels were immersed in isopropanol containing a red dye for 24 hours at 70° C. The coatings were examined under a microscope for cracking (shown by the dye).

TABLE THREE

| | Load applied (kg) (e) | Recoil | |
|---|---|---|---|
| Coating | | Degrees (f) | % (f) |
| PEEK (a) | 0.6* | 70 | 78 |
| PEEK (a) | 1.0 | 45 | 50 |
| PEEK + BN (b) | 0.4* | 37 | 41 |
| PEEK + BN (b) | 0.6 | 50 | 56 |
| PEEK + BN (b) | 1.0 | 25 | 28 |

Notes to Table Three
(a) and (b) are as defined in Notes to Table One.
(e) The coated wires were annealed as described in Note (d) to Table Two. The annealed, coated wires were then bent through 90° over a 6 mm diameter mandrel using the specified load applied. The load was then removed and the amount of recoil measured.
*Indicates the minimum load required to bend the coated wire through 90°
(f) Recoil is measured from the 90° of arc and is expressed both in degrees of arc and as a percentage of 90° · (90° of recoil = 100% recoil)

Injection moulded samples of the compositions of Examples 1 to 3 were subjected to limiting oxygen index, smoke density, toxic gas emission and flammability tests and also to thermo-gravimetric analysis. The results are set out in Tables Four to Six. Specimens were cut from discs 11.4 cm diameter and 3.2 mm thick, injection moulded using an injection moulding machine operating at 380° C. with a mould at about 150° C.

TABLE FOUR

| Sample (h) | Limiting Oxygen Index (i) |
|---|---|
| PEEK | 35 |
| 1 | 43 |
| 2 | 47 |
| 3 | 45 |

Notes to Table Four
(h) PEEK is as defined in Note (a) to Table One, with the exception that Grade 450 G was used.
1, 2, and 3, indicate the blends of the numbered Examples.
(i) Limiting oxygen index is measured according to ASTM Test Method D2863-77 and is the minimum concentration of oxygen which will just support combustion of a test specimen of dimensions 6.5 (±0.5) mm × 3.0 (±0.5) mm × 70-150 mm cut from the injection moulded discs. The specimen is ignited using a hydrogen or propane flame and must burn for at least three minutes or for a length of at least 50 mm.

TABLE FIVE

| | Smoke test (j) | | | | Gas analysis (k) | | | |
|---|---|---|---|---|---|---|---|---|
| Sample (h) | Minimum trans % | Time to minimum trans (min) | $D_m$ | Weight loss % | CO (ppm) | $CO_2$ (%) | $SO_2$ (ppm) | HCN (ppm) |
| PEEK | 91 | 20 | 5 | 1.5 | 240 | 0 | ND | ND |
| 1 | 95.5 | 37 | 2.5 | 0.55 | 170 | 0 | ND | ND |
| 2 | 95 | 20 | 3 | 0.8 | 150 | 0 | ND | ND |

TABLE FIVE-continued

| | Smoke test (j) | | | | Gas analysis (k) | | | |
|---|---|---|---|---|---|---|---|---|
| Sample (h) | Minimum trans % | Time to minimum trans (min) | $D_m$ | Weight loss % | CO (ppm) | $CO_2$ (%) | $SO_2$ (ppm) | HCN (ppm) |
| 3 | 97 | 20 | 2 | 0.4 | 150 | 0 | ND | ND |

Notes to Table Five
(h) is as defined in Notes to Table Four.
(j) Smoke density test was carried out in a NBS smoke chamber using the procedure of ASTM Test Method E662-79. The test specimens were 76 × 76 mm × 3.0 (±0.5) mm, (cut from the injection moulded discs) and were mounted in a holder to expose an area about 65 × 65 mm. The test was carried out in the flaming mode and the smoke density was determined by passing a collimated light beam (from an incandescent light source) vertically through the smoke chamber to a photodetector.
$D_m$ is the Maximum specific optical density.
(k) After exposure of the sample in the smoke chamber for 20 minutes, gas samples were taken using Drager tubes and the samples were analysed. The results for CO and $CO_2$ include a correction for the quantities of these gases emitted by the gasjets.

ND means that the proportions of these gases were below the lower limits of detection of the test, that is <1 ppm of $SO_2$ and <2 ppm of HCN.

Examination of the PEEK+BN sample of Example 1 which had been exposed in the NBS smoke chamber for 20 minutes showed a pronounced intumescent effect and a hard char.

TABLE SIX

| | Burning test (l) | | |
|---|---|---|---|
| | | Mean Burn time | |
| Sample (h) | Classification | 1st ignition (sec) | 2nd ignition (sec) |
| PEEK | 94V-0 | 0 | 2 |
| 1 | 94V-0 | 0 | 0.6 |
| 2 | 94V-0 | 0 | 0 |
| 3 | 94V-0 | 0 | 0 |

Notes to Table Six
(h) is as defined in Notes to Table Four.
(l) Flammability was tested using the Underwriter's Laboratories UL94 vertical test. The test specimens were about 110 × 12.7 mm area and cut from the injection moulded discs. Each specimen was clamped in a draught free cabinet and ignited by applying a blue bunsen burner flame for 10 seconds. The time taken for the flame to go out was recorded after a first and a second ignition.

A quantity of granules obtained by Example 1 was subjected to thermo-gravimetric analysis between 200° and 500° C. using a temperature rise of 5° C. per minute. The total weight loss from the polyetheretherketone/boron nitride composition produced by the process of Example 1 was about 2% up to a temperature of about 520° C. (PEEK shows a total weight loss of about 3% under the same test conditions).

Test specimens of about 10 mm × 10 mm × 3.0(±0.5) mm in size, cut from the injection moulded discs, were subjected to tribilogical testing. The test results are set out in Tables Seven and Eight.

TABLE SEVEN

| | Ambient Temperature | | | | | 200° C. | | | | |
|---|---|---|---|---|---|---|---|---|---|---|
| Sample (h) (m) | Load (kg) (n) (o) | LPV (n) (p) | CF (n) (q) | Wear Rate (n) (r) | (s) | Load (kg) (n) (o) | LPV (n) (p) | CF (n) (q) | Wear Rate (n) (r) | (s) |
| PEEK | 70 | 3640 | 0.42 | 303 | 432 | 70 | 4010 | 0.2 | 350 | 300 |
| PEEK + PTFE | 140 | 7115 | 0.12 | 250 | 250 | 150 | 7030 | 0.11 | 250 | 458 |
| 1 | 200 | 10310 | 0.06 | 408 | 413 | 210 | 9815 | 0.05 | 127 | 279 |

Notes to Table Seven
(h) is as defined to Notes to Table Four
(m) PEEK + PTFE is a composition of polyetheretherketone (Victrex' PEEK aromatic polymer, 450 G grade) and polytetrafluoroethylene ('Fluon' (Registered Trade Mark) L169 lubricant grade polytetrta fluoroethylene powder) containing 15% by weight of polytetrafluoroethylene and obtained by a method as described for the production of PEEK + BN in Example 1.
(n) Tribilogical data was obtained using an Amsler Wear Test Machine operating in a pad on ring confiuration. The pads were the test specimens of 10 mm × 10 mm × 3.0 (±0.5) mm described previously. The ring was 60 mm in diameter and 6mm wide and was formed of EN8 steel ground to a surface finish of 0.3 to 0.4 micrometers Ra. The ring was rotated to give a surface speed of 100 feet/minute (30.48 meters/minute). The test specimen was "run in" for 10 minutes under a 10 kg load and for a further 10 minutes under a 30 kg load. The load was then increased in increments of 20–30 kg and each load was maintained for 0.5 hour. The load was increased up to a maximum of 210 kg or until one of the failure criteria was exceeded. The failure criteria are catastrophic (that is rapid) increase in wear, friction or temperature. Tests were carried out at ambient temperature and at 200° C.
(o) Maximum test load reached before failure.
(p) Limiting value of PV (Pressure X Velocity) is calculated by dividing load (in kg) by actual area of contact (wear scar area in $cm^2$) and multiplying result by surface speed (in m/minute).
(q) CF is the coefficient of friction and is the average of the coefficient of friction at the load giving the limiting value of PV and the coefficient of friction at half the load which gives the limiting value of PV. The coefficient of friction was measured continuously.
(r) Wear rate up to half the load which gives the limiting value of PV.
(s) Wear rate up to the load which gives the limiting value of PV.

TABLE EIGHT

| Sample (h) (m) | Ambient temperature | | | | | 200° C. | | | | |
|---|---|---|---|---|---|---|---|---|---|---|
| | Load (kg) (o) (t) | LPV (p) (t) | CF (q) (t) | Wear Rate (t) (r) | (s) | Load (kg) (o) (t) | LPV (p) (t) | CF (q) (t) | Wear Rate (t) (r) | (s) |
| PEEK | 8 | 1480 | 0.58 | 450 | ND | 8 | 1500 | 0.51 | 150 | 300 |
| PEEK + PTFE | 20 | 3645 | 0.28 | 600 | 138 | 12 | 2270 | 0.27 | ND | 180 |
| 1 | 40 | 6085 | 0.07 | 330 | 247 | 20 | 6580 | 0.05 | 51 | 119 |

Notes to Table Eight
(h) is as defined in Notes to Table Four.
(m) to (s) are all as defined in Notes to Table Seven.
(t) Tribilogical data was obtained essentially as described in Note (n) to Table Seven with the exception that the ring was rotated to give a surface speed of 600 feet/minute (182.9 meters/minute) and the test specimen was 'run in' differently. The test specimen was 'run in' for 10 minutes under a 3 kg load and for a further 10 minute under 5 kg load. The load was increased in 5 kg increments to a maximum of 40 kg.

The compositions of Examples 2 and 3 were coated onto 1 mm diameter copper wire in the manner described previously in respect of the composition of Example 1. For the purposes of comparison, the copper wire was also coated with different grade of the polymer (polyetheretherketone) alone.

The tests described previously and reported in Tables One to Three were repeated and the results of these additional tests are set out in Tables Nine to Eleven.

TABLE NINE

| Aging Time (Weeks) | Coating | | | | | |
|---|---|---|---|---|---|---|
| | PEEK (u) | | 2 (u) | | 3 (u) | |
| | 240° C. (c) | 300° C. (c) | 240° C. (c) | 300° C. (c) | 240° C. (c) | 300° C. (c) |
| 1 | Pass | Pass | Pass | Pass | Pass | Fail |
| 2 | Pass | Fail | Pass | Fail | Pass | — |
| 3 | Pass | — | Pass | — | Pass | — |
| 4 | Pass | — | Pass | — | Pass | — |
| 5 | Pass | — | Pass | — | Pass | — |

Notes to Table Nine
(c) is as defined in Notes to Table One.
(u) PEEK is as defined in Note (a) to Table One with the exception that Grade 450 G was used.
2 and 3 indicate the blends of the numbered Examples.

TABLE TEN

| Coating Test (d) | PEEK (u) | 2 (u) | 3 (u) |
|---|---|---|---|
| 1 D Wrap | No cracks | No cracks | No cracks |
| 3 D Wraps | No cracks | No cracks | No cracks |
| 5 D Wraps | No cracks | No cracks | No cracks |
| 14 D Wraps | No cracks | No cracks | No cracks |

Notes to Table Ten
(d) is as defined in Notes to Table Two.
(u) is as defined in Notes to Table Nine.

TABLE ELEVEN

| Coating (u) | Load Applied (kg) (e) | Recoil | |
|---|---|---|---|
| | | Degrees (f) | % (f) |
| PEEK | 1.0* | 47 | 52 |
| 2 | 1.0* | 35 | 39 |
| 3 | 1.0* | 39.5 | 44 |

Notes to Table Eleven
(e) and (f) are as defined in Notes to Table Three.
(u) is as defined in Notes to Table Nine.

I claim:

1. A polyaryletherketone composition which has a pliability which is such that a copper wire of mean diameter 1 mm, when coated with the composition to give a coating of 0.25 mm average thickness, shows a recoil of not more than 40°, after bending through 90° using the minimum load to bend the coated wire through 90°.

2. The composition of claim 1 wherein the minimum load required to bend the coated wire through 90° is 0.5 kilogramme or less.

3. A polymer composition comprising a mixture of a polyaryletherketone with boron nitride.

4. The composition of claim 3 which also includes at least one further component which is a stabiliser, an inorganic or organic fibre or an inorganic or organic filler.

5. The composition of claim 3 which contains from 5 up to 30% by weight of boron nitride relative to the total weight of the composition.

6. The composition of claim 3 wherein the polyaryletherketone component is a polymer which contains the repeat units

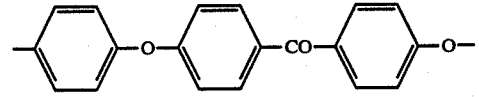   I or the repeat units

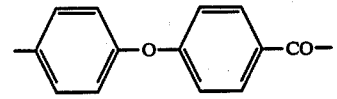   II alone or in conjunction with each other and/or in conjunction with other repeat units.

7. The composition of claim 6 wherein the polyaryletherketone is a crystalline polymer containing the repeat units I.

8. The composition of claim 3 wherein the boron nitride has a weight average particle size of not more than 10 micrometers.

9. A process for the production of a polymer composition which comprises mixing together a polyaryletherketone with boron nitride and optionally with at least one further component which is a stabiliser, an inorganic or organic fibre or an inorganic or organic filler.

10. The process of claim 9 wherein the materials are mixed together using a solids blending technique and the obtained blend is extruded.

11. An electrical conductor which is provided with an insulating coating formed from the polymer composition of claim 3.

12. A plain bearing which is formed from a polymer composition or from a metal backing having a lining formed from a polymer composition, wherein the polymer composition is the polymer composition of claim 3.

13. A polymer composition consisting essentially of a mixture of a polyaryletherketone with boron nitride.

* * * * *